J. M. PETERMAN.
REIN HOLDING ATTACHMENT FOR VEHICLES.
APPLICATION FILED NOV. 3, 1908.
951,220.
Patented Mar. 8, 1910.
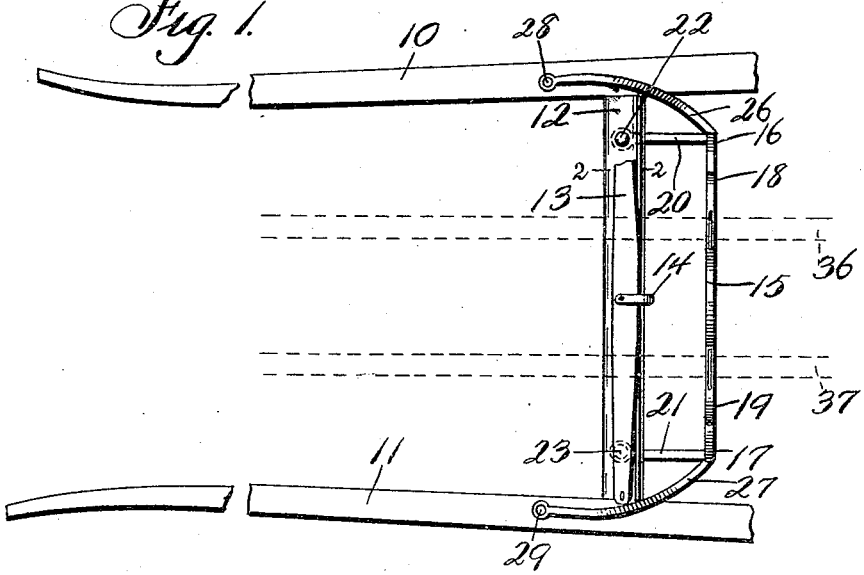
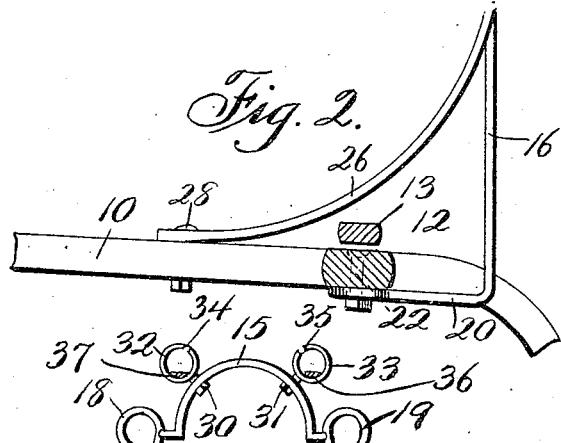
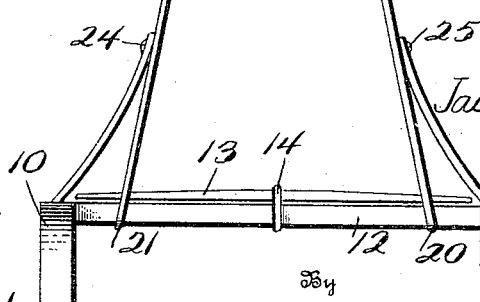
Witnesses
Albert L. Kry
C. N. Woodward
Jacob M. Peterman
Inventor
By
Attorneys

UNITED STATES PATENT OFFICE.

JACOB M. PETERMAN, OF NEW MARKET, IOWA.

REIN-HOLDING ATTACHMENT FOR VEHICLES.

951,220.  Specification of Letters Patent.  Patented Mar. 8, 1910.

Application filed November 3, 1908. Serial No. 460,850.

*To all whom it may concern:*

Be it known that I, JACOB M. PETERMAN, a citizen of the United States, residing at New Market, in the county of Taylor, State of Iowa, have invented certain new and useful Improvements in Rein-Holding Attachments for Vehicles; and I do hereby declare the following to be a full, clear, and exact description of the invention, such as will enable others skilled in the art to which it appertains to make and use the same.

This invention relates to attachments for vehicles for supporting driving reins above the back of a horse to prevent the horse from switching his tail over the reins, and to prevent the reins from engaging with projecting portions of the harness and to protect and guard the terminals of the whiffle tree, and has for one of its objects to simplify and improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a plan view of a pair of thills with the improvement applied. Fig. 2 is a side elevation of the same enlarged and in section on the line 2—2 of Fig. 1. Fig. 3 is a rear elevation of the parts shown in Fig. 1.

The improved device may be applied without material structural changes or modifications to thills of different sizes and of different constructions, but for the purpose of illustration is shown applied to a conventional pair of thills in which 10—11 represent the thills proper, 12 the rear cross-bar, and 13 the swingle-tree swiveled at 14 upon the cross-bar in the usual manner.

The improved device comprises an arched frame including an upper member 15 and spaced side members 16—17, the upper member 15 preferably curving upwardly and united to the side members by ornamental scroll work 18—19. The arched frame may be of any required size and of any suitable material, but will preferably be of metal and of any required shape or ornamental design. The lower ends of the side members 16—17 are directed forwardly as shown at 20—21, and extend beneath the cross-bar 12 and are bolted or otherwise secured at 22—23 thereto. The forwardly directed portions 20—21 thus locate the side members 16—17 rearwardly of the cross-bar 12 to a sufficient extent to permit the requisite swinging movement of the whiffletree. Connected at 24—25 to the members 16—17 are braces 26—27, which curve forwardly and downwardly the lower ends of the braces being detachably coupled by bolts or other fastening means 28—29 to the thills 10—11. By this means the arched frame is firmly coupled to the thills and supported in a vertical position rearwardly of the cross-bar, while the braces 26—27 form guards to protect the terminals of the swingle tree or whiffle tree. The arched frame is thus located at a sufficient distance rearwardly of the horse to prevent the latter from switching his tail in contact with the frame or otherwise interfering with it.

Detachably coupled at 30—31 to the upwardly curving portion 15 of the arched frame are guide members 32—33, preferably in circular form and with contracted openings 34—35 through which the reins 36—37 may be inserted, and from which they will not readily be separated when in use.

By this simple means the reins are supported and guided at a considerable distance above the back of the horse and will not be interfered with by the switching of the horse's tail, and the reins will likewise be prevented from coming in contact with projecting portions of the harness, especially the buckles and other portions of the hip straps.

It will be noted that the arched frame 16—17 extends to a considerable extent rearwardly of the cross bar 12 and the whiffle-tree 13, so that the reins are supported at a point relatively near the dash board, and within easy reach of the driver, so that in event of the dropping of the reins, they will be caught by the arched frame, and retained in position within easy reach of the driver, and will not drop down over the horse's back, the reins are thus retained at all times in position free from the harness or from the horse, as will be obvious.

The improved device is simple in construction, can be inexpensively manufactured, and readily applied to vehicles of various makes and constructions.

What is claimed, is:—

A rein support consisting of an arched bar having rein guides at its bight portion, the end portions of the bar being bent in the same direction at right angles to the plane of the arched bar and terminating in eyes, and a brace secured to each side of the arched bar near the bight thereof and extending downwardly and outwardly beyond the eyes at the ends of the arched bar and having terminal eyes lying beyond said ends and in a plane above the plane of the eyes at the ends of the arched bar.

In testimony whereof, I affix my signature, in presence of two witnesses.

JACOB M. PETERMAN.

Witnesses:
H. E. TOMLINSON,
J. W. DENNEY.